Figure 1:
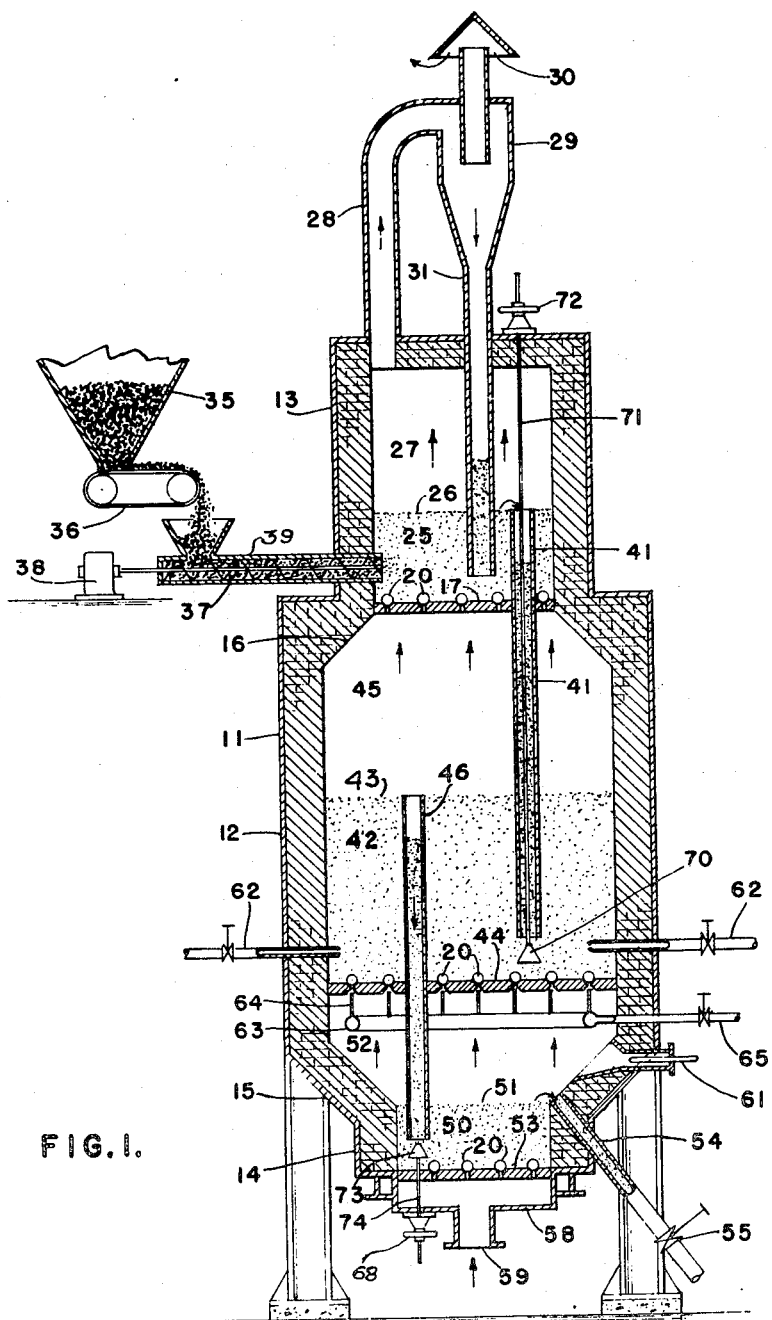

INVENTOR:
FRANK S. WHITE,
BY
ATTORNEY

April 11, 1950

F. S. WHITE 2,503,788

REACTOR FURNACE

Filed Nov. 29, 1945

3 Sheets-Sheet 2

INVENTOR:
FRANK S. WHITE,

BY Arthur Middleton
ATTORNEY

April 11, 1950     F. S. WHITE     2,503,788
REACTOR FURNACE
Filed Nov. 29, 1945     3 Sheets-Sheet 3
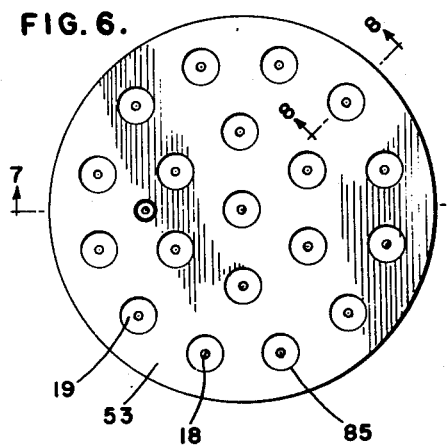
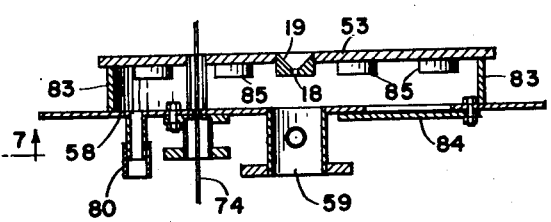
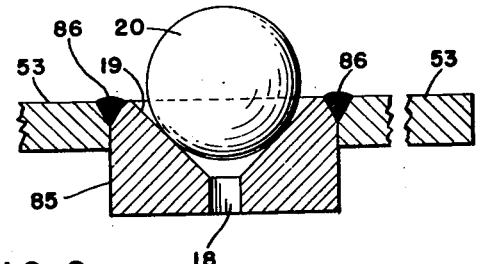
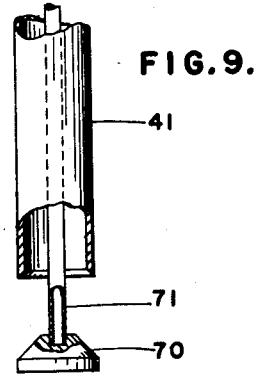
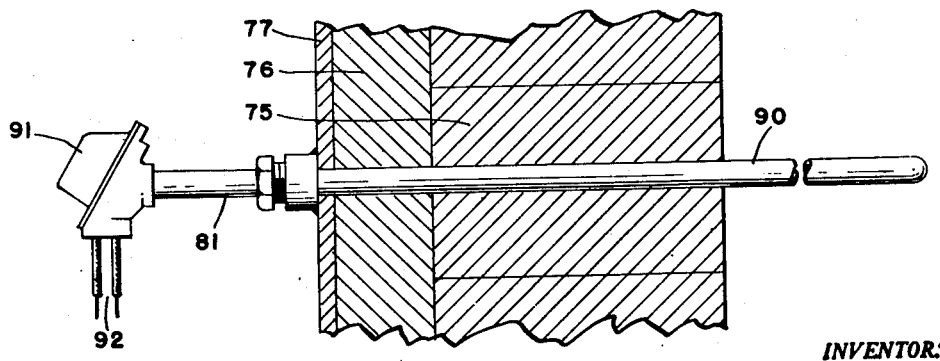
INVENTOR:
FRANK S. WHITE,
BY Arthur Middleton
ATTORNEY Patented Apr. 11, 1950

2,503,788

UNITED STATES PATENT OFFICE 2,503,788

REACTOR FURNACE

Frank S. White, Westport, Conn., assignor to The Dorr Company, New York, N. Y., a corporation of Delaware Application November 29, 1945, Serial No. 631,573

7 Claims. (Cl. 23—284)

This invention relates to the contacting of solids and gases under conditions whereby it is desired to effect some action therebetween, either physical or chemical or both and especially where heat treatment is involved. More particularly the invention relates to a reactor having an enclosed casing in which is maintained an ever-changing constantly renewed body of gas and a gas permeable apertured substantially horizontal partition dividing the casing into an upper and a lower compartment. On this partition is supported a bed or layer of solids to be treated with a free-board space thereabove while gas to treat the solids is passed through the apertured partition under such conditions that the solids of the bed are rendered into dense suspension in the upflowing gas, that is, mobilized or fluidized so that the bed simulates a boiling liquid. A reactor of this type is arranged so that the fluid level of the bed is determined by the top of a spill-conduit adapted to conduct treated solids downwardly away from the fluid level of the bed, while the solids fed for treatment in the bed are supplied thereto beneath its fluid level whereby solids being treated while in suspension in the bed rise co-currently with the upflowing solids-suspending gas while the feeding of the solids and their discharge takes place countercurrently to the upflowing gas.

When a reactor of these characteristics is shut down, the upflowing gas is shut off with the result that the fluidized solids of the layer or bed supported on the apertured horizontal partition cease to be mobilized and in suspension so they come to rest and form a mass of static solids on the partition. But, since the size of the solids of the bed generally is smaller than the diameter of the apertures or perforations in the partition, the solids pour downwardly through these apertures until the bed or layer of the solids no longer exists. In other words, when such a reactor is shut down, the reactor burden unavoidably automatically discharges, so it is one object of this invention to prevent such undesired discharge.

More particularly, an object of this invention is to provide curved surface means associated with the apertures in the partition in the reactor that supports the bed of solids to be treated to permit of the effective delivery and distribution of gas upflowing through the apertured partition into and through the bed of solids on the partition to fluidize them while such means automatically operate, upon cessation of gas upflow through the apertures of the partition, to close the apertures against solids downflow therethrough.

Another object of this invention is to devise such means so that after once closing the apertures through the partition, they change to open position quite readily and assuredly upon the renewal of gas upflowing through the apertures in the starting-up operation of the reactor.

A still further object of this invention is to devise these aperture controlling means so that they exhibit an additional function of improving the efficiency of the distribution of the gas emitted from the apertures of the partition into the bed of solids supported on the partition for fluidizing those solids.

The best embodiment of the invention now known to me is shown in the accompanying drawings, but it is so shown for illustrative purposes only, and is not to be taken as limiting, for obviously the invention is capable of other embodiments, and of different constructional arrangement, so long as they fall within the scope of the appended claims.

Figure 2:
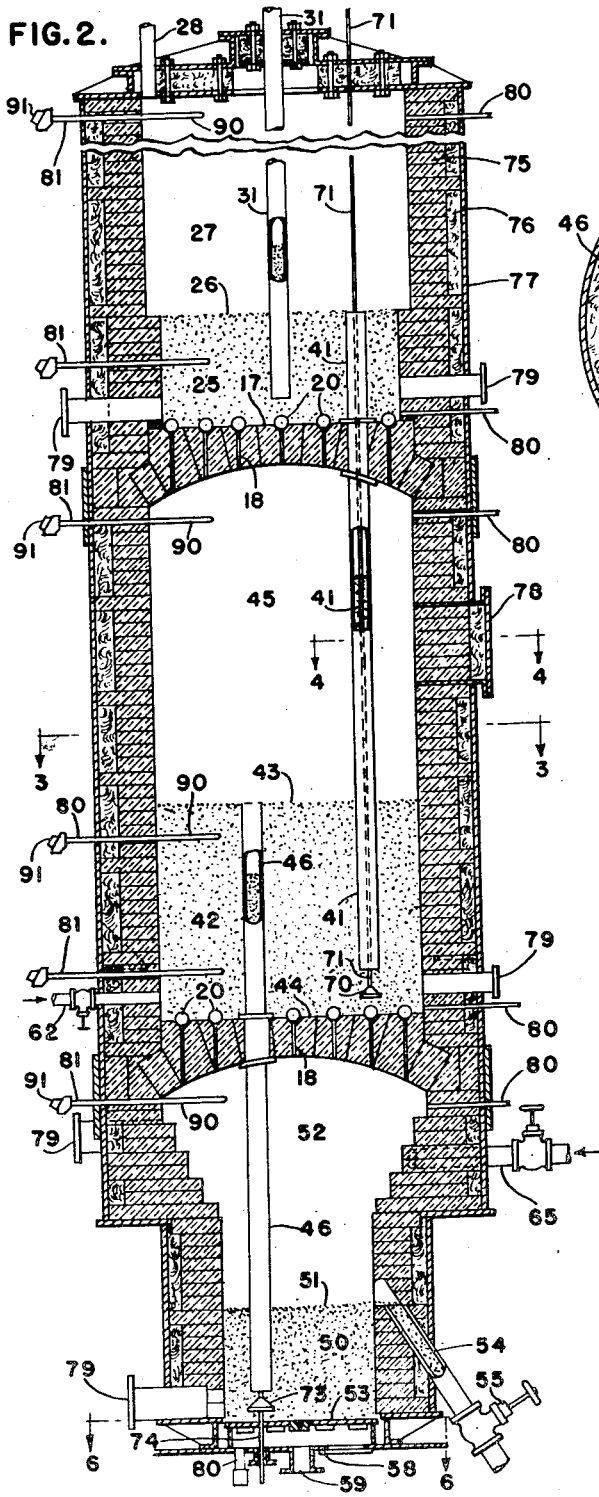
Figure 3:
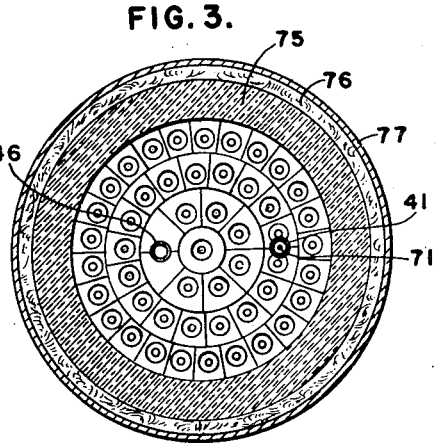
Figure 4:
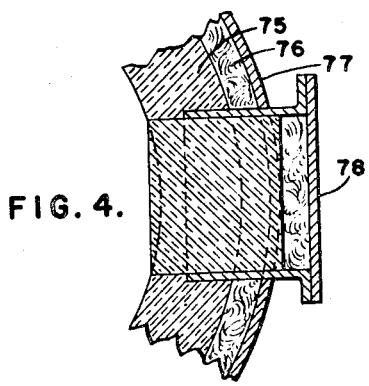
Figure 5:
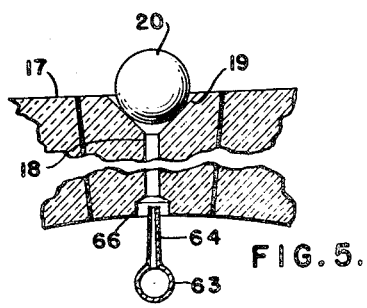

In the drawings, Fig. 1 is a vertical sectional view of my preferred reactor. Fig. 2 is an enlarged vertical sectional view of the reactor furnace shown with more particularity than in Fig. 1, but with less completeness. Fig. 3 is a plan view taken along the lines 3—3 of Fig. 2 while Fig. 4 is also a plan view but taken along the lines 4—4 of Fig. 2. Fig. 5 is a partial vertical sectional view through one of the refractory bricks forming a unit of construction of the apertured platform or constriction plate on which the fluidized beds rest, showing a ball-seat and ball in the upper part of the figure, and in the lower part of the figure, a possible arrangement of gas jet associated with a throat of the aperture. Fig. 6 is a plan view of the top of the wind-box taken along the lines 6—6 in Fig. 2. Fig. 7 is a vertical sectional view taken through the wind-box. Fig. 8 is an enlarged partial sectional view through one of the ball seats of the constriction plate or platform. Fig. 9 is an enlarged partial isometric view through the valve in its relationship to its spill-conduit. Fig. 10 is a vertical sectional view with parts in full view of one of the temperature indicators used on the reactor.

The reactor of this invention when embodying certain features of this invention may take the form of a single compartment reactor including one apertured constriction plate with one fluidized bed thereon and one free-board space thereabove, while when embodying other features, it may take the form of a multi-compartmented reactor having a plurality of such compartments in superposed relationship. Since the latter embodiment uses all of the features of this invention, that form is illustrated in the accompanying drawings and will be described as follows:

In the drawings, 11 represents a suitably supported enclosed reactor furnace comprising a steel shell suitably insulated and lined with refractory bricks. It has a substantially cylindrical middle portion or section 12 in which heat treatment takes place, an upper or initial section 13 in which pre-heating takes place, normally smaller in diameter than the middle section 12, and a bottom section 14 where cooling takes place which is as small in diameter or smaller than the initial section 13. The bottom section 14 has a transition-tapered wall section 15 between it and the middle section 12, and there is a more or less similar transitionary tapered wall or section 16 between the middle section 12 and the upper or initial section 13.

In the upper section 13, adjacent its lower end or bottom, is a gas permeable initial constriction diaphragm platform or plate 17 extending substantially horizontally across the section 13 and provided with a multiplicity of perforations or apertures 18 upwardly through which gas may pass, with such apertures preferably terminating at their top in a countersunk seat section 19 (see Fig. 5) on which is sustained a ball 20. The plate and balls are made of heat-resistant metal or refractory material. Supported on and extending upwardly from the plate 17 is an initial ever-changing layer or bed of solids to be treated with gas. These solids are to be fluidized into a turbulent mobilized suspension by the gas passed upwardly therethrough at such velocities that the solids act like a fluid and present a fluid level 26, above which is free-board space 27. Rising from the top region of the initial or upper section 13 is a pipe or conduit 28 for conducting dust particles rising from the fluidized layer 25 to a cyclone 29. Gas escapes from the cyclone through its top as at 30, while solids separated from entrainment in the gas, drop down through pipe 31 to the layer 25 in a region adjacent the bottom of the layer and close to the constriction plate 17, since the lower end of the pipe 31 is submerged in the fluidized layer, as shown.

Solids to be treated in the reactor are supplied thereto from a hopper 35 from whence they drop onto an endless weighing conveyor 36. The belt delivers such solids into a screw conveyor 37 suitably driven by a motor 38. The conveyor screw operates in a conducting or delivery tube or pipe 39 that passes through the wall of the reactor and terminates in the layer or bed 25 in a region adjacent the bottom thereof as shown.

The fluid level 26 of the layer or bed 25 is controlled by the elevation of the upper end of a spill-pipe or conduit 41 which pipe extends downwardly through the bed 25 and plate 17 terminating submergedly in an ever-changing layer or bed 42 under treatment in the middle section 12 of the reactor. This bed or layer is fluidized like the initial bed 25 and has a fluid level 43 as well as a free-board space 45 thereabove. This bed is supported on or from a second or middle gas permeable constriction diaphragm, platform or plate 44 perforated or apertured as at 18, with each perforation having a seat 19 and a ball 20, the same as the initial apertured plate 17.

The fluid level 43 of the second or heat-treatment bed or layer 42 is controlled by the elevation of the upper end of a spill-pipe or conduit 46 which pipe extends downwardly through the fluidized bed 42 and plate 44, terminating submergedly in an ever-changing cooling layer or bed 50 in the bottom section 14 of the reactor. This bed is fluidized like the beds 25 and 42 and has a fluid level 51 as well as a free-board space 52 thereabove. This bed or layer 50 is supported on or from a third or bottom constriction diaphragm plate or platform 53, perforated or apertured as at 18, with each perforation having a seat 19 and a ball 20, the same as in plates 17 and 44.

The fluid level 51 of the bottom bed or layer 50 is controlled by a discharge conduit or spill-pipe 54 suitably valved as at 55 that conducts treated solids to a place outside of the reactor. The bottom section 14 of the reactor terminates in a wind-box 58 having an entrance inlet 59 for compressed air or other gas, which the wind-box conducts to the underside of the construction plate 53 so that air therefrom can pass upwardly through the ball controlled apertures therein for the purpose of fluidizing or suspending or teetering the solids in the bed 50.

Into the tapered section 15 of the reactor, extends an auxiliary burner 61, while into the middle or heat-treatment bed 42 may extend suitably valved oil injection pipes 62 (or an equivalent electrical heating equipment) terminating in that bed adjacent the bottom thereof. Alternatively, there may be located under the middle constriction plate 44, in the free-board space 52, a bustle pipe 63 with upstanding nozzles or jets 64 through which gaseous fuel is supplied to the reactor, through valved feed pipe 65. Each nozzle or jet terminates adjacent an aperture 18 in the constriction plate 44 such as in the throat 66 thereof as shown in the lower section of Fig. 5. Spill-pipe 41 is provided with a closure 70, preferably at its lower end and in the form of substantially that of a cone, which is controlled to open and close it by means of a shaft 71 extending upwardly through the spill-pipe and the top or roof of the reactor to a control wheel 72. Spill-pipe 46 has its lower end closed by a similar coned valve 73, operated from a downwardly extending shaft 74 and a control wheel 68.

Suitable temperature indicators, such as a thermocouple, are used in each free-board space 27, 45 and 52 respectively and in the bottom section of layers 25, 42 and 50 respectively while suitable pressure indicators are used in the free-board spaces and in the layers. These have been shown in Fig. 1 but will be described later.

The space between one apertured plate and another, in this multi-compartment reactor, may be referred to as a compartment or chamber and each includes a fluidized bed and its free-board space immediately thereabove. The constriction plates 17, 44 and 50 are of suitable heat-resistant material, either of metal or of refractory ceramic.

The operation of the reactor is continuous. Assuming that it has been properly started-up and the various layers or beds are properly fluidized by the controlled velocity of gas passing upwardly therethrough, feed solids are supplied from the hopper 35 by the feed screw 37 through the feed pipe 39 into the bottom section of the initial or pre-heating layer 25. Solids in layer 25 are preliminarily heated by the hot gases from free-board space 45 uprising therethrough from the apertures 18 of the constriction plate 17. Dust from the bed entrained in gas rising therefrom passes through conduit 28 to the cyclone 29 wherein the dust particles are separated from the gas and descend through pipe 31 back to the layer 25 for re-treatment, while gas escapes from the cyclone at 30. Fluidized or teetered solids rising above the top of the spill-pipe or conduit 41 (fluid level 27), spill over the top thereof and fall down that pipe to the bottom section of the dissociation layer 42 for submerged delivery thereinto.

The main layer 42 where the major reactions are to take place, is maintained at the desired temperature and in fully fluidized or mobilzed condition by gas uprising from free-board space 52 therethrough from the apertures 18 in constriction plate 44. Treated fluidized solids rising above the top of the spill-pipe or conduit 46 (fluid level 43), spill over the top thereof and fall down that pipe to the bottom section of the cooling layer 50 to the bottom section thereof for submerged delivery thereinto.

The cooling layer 50 is maintained at cooling temperatures and in fully fluidized condition by gas rising through apertures 18 in constriction plate 53 from the wind-box 58. Cooled solids pass from the fluid level 51 of the cooling layer 50 by spilling over and into the upper end of the discharging spill-pipe or conduit 54 to discharge. In this way, each layer or bed is not only maintained fluidized but made up of ever-changing solids being treated with gas in such layers.

The main or middle layer 42 is maintained at proper temperature by being heated. Heating is accomplished either (or both) by the use of oil as fuel supplied, for instance, through the oil injection pipes 62 leading into that layer (or equivalent electrical heating apparatus), or by the use of gas as fuel supplied, for instance, through the bustle pipe 63 and its jets or nozzles. If such jets or nozzles are used, it is desirable, in order to minimize danger of explosion, to have each jet deliver its gas directly into the throat 66 (Fig. 5) of an aperture 18 of the constriction plate 44. For initial heating up of the reactor, an auxiliary gas burner 61 is provided, which is unused after the reactor and its burden get up to operating temperature.

When starting up, the cone valve 73 at the bottom of spill-pipe 46 is closed; cone valve 70 at the bottom of spill-pipe 41 is closed; and valve 55 in discharge pipe 54 is also closed. Compressed air or other relatively cool gas admitted to the wind-box 58 flows upwardly through constriction plate 53 at a velocity to unseat the balls 20 from their seats 19. The auxiliary burner 61 is started. At this time, solid material to be treated in the reactor, which material has been crushed to pass a 14 mesh screen, the bulk of which, however, is coarser than 200 mesh, is delivered to the initial or pre-heating layer 25 by means of the feeder elements 36, 37 and 39. The rising current of hot air will cause, when at a velocity of substantially from 0.50 to 2.0 feet per second, the crushed solids to be fluidized, imparting to the mass thereof a turbulent motion simulating a boiling liquid, and like a liquid it will assume a fluid level in the layer 25. Feed solids are supplied until the layer reaches a fluid level 26 whose elevation is controlled by the upper end of the spill-pipe or transfer conduit 41 and starts to drop or fall down that pipe, whereupon the cone valve 70 is opened to allow the spilling solids to fall onto the constriction plate 44. This operation is continued until the level of the solids in the main or middle layer 42 is sufficient to seal the lower end of the pipe 41. When the layer 42 has been about half formed, or formed to about half its normal height, the feed is stopped. The temperature of the solids in the layer 42 is made to rise by heat from the auxiliary burner 61. When the heat reaches a temperature sufficient that the regular fuel, either gaseous or liquid, will ignite, the auxiliary burner is shut down. The main fuel system is then started, namely, either the oil burners 62 or the gas burners 64. The fuel will then combust in the layer with the air supplied, and the very large mass of hot solid particles present a large area to promote surface combustion. When the layer reaches a minimum temperature, feeding is started again and cone valve 73 at the bottom of spill-pipe 46 is opened. Solids from layer 42 spill over into spill- or dip-pipe 46, which delivers them onto the constriction plate 53 whereupon a layer 50 builds up to an elevation or liquid level 51 whereupon solids flow down discharge pipe 54. The hot, treated solids submergedly delivered to the layer 50 are cooled in that layer by heat exchange with the current of air uprising therethrough to maintain combustion in the dissociation layer 42. Finished product is delivered through discharge pipe 54, the flow being regulated by valve 55.

Solids in the initial layer 25 are preliminarily heated by heat exchange with the current of heated gas uprising through that layer, comprising the products of combustion in the layer 46 plus any gas yielded as a result of heat treatment of solids in that layer.

It is to be noted that except for the auxiliary burner 61, there is no heating of the gas or air in the lowermost or cooling bed 50, or of its free-board space 52. Thus, in normal operation the sole direct application of heat to the main layer 42 is very important in order to get the maximum cooling effect in the cooling layer or bed 50 to which no heat is applied.

When shutting down, the supplied gas and fuel is stopped and the cone valves 70 and 73 are closed. The solids in each layer remain on their respective constriction plates where they are because the balls 20 or equivalent curved surfaces drop back into their seats 19 and thus prevent descent of solids through the apertures 18.

Such a ball 20 must meet certain requirements as to itself; as to its relation to its seat; as to the mass and velocity of the gas passing through the apertures in the partition; and as to the size and density of the solids being treated. It has been found that with a given mass and velocity of gas through the aperture, the pressure drop due to the ball in the conical seat increases as the diameter of the ball decreases due to some aerodynamic effect forcing the ball to its seat. Consequently the diameter of the ball should be chosen large enough to minimize this pressure drop as compared to the pressure drop through the cylindrical aperture itself. In general, balls of a diameter range of substantially one to six inches will suffice for most cases. Further, larger balls give better gas diffusion with a given mass and velocity of gas, so the larger the ball the better.

The diameter and number of the cylindrical apertures is so chosen that under conditions of operation the pressure drop through the apertures will be 50 to 100% of the pressure drop of the bed above. This is done to cause the upflowing gas to distribute itself uniformly across the reaction vessel.

The ball should be of such a density as compared with the bed density that the ball, when unseated, has not substantial tendency to float out of or away from its seat. The ball normally should not rise out of its seat to an extent that a line tangent to its lower periphery is equal in height to or above, the surface level of the upper surface or face of the partition in which its seat is provided. The ball should be off its seat to some extent during gas flow therepast and indeed it is desirable that the ball chatter in its seat during such gas flow but it should not go completely out of its seat. This can be accomplished by attention to the foregoing technical specifications for the ball.

The diameter of the cooling layer 50, and that of the initial pre-heating layer 25 should normally be less than that of the middle layer 42, as shown in the drawings. The reason is in order to maintain gas velocities through each layer all substantially uniform and so that they fall within the limits of from 0.75 to 1.5 feet per second. To attain such uniformity, there must be taken into consideration the fact that only relatively cool air from the wind-box 58 passes through the bottom or cooling layer 50, while that air when very hot plus the fuel passes through the heated middle layer 42, and through the initial or preheating layer 25 there passes gas made up of products of combustion that have been substantially reduced in temperature. In other words, the temperature of the gas as well as its pressure are important factors to consider when determining velocities attained. The middle layer may be from two to three times the temperature of the bottom or cooling layer, while those of the initial or pre-heating layer are somewhere in between, so these are different enough to have to be considered. The velocities mentioned are "space rates," that is, the velocity that the gas would have through space unoccupied by any solids. The free-board spaces preclude excessive dust losses. The reactor may be circular, square or other shape in cross-section.

In the multi-compartment reactor embodiment of this invention, the overflowed solids are generally conducted directly to the lower portion of a lower bed. This is important when the diameter of the fluidized bed is small compared to its depth because the path of travel of the solid particles from their point of entrance to their point of exit is thereby increased and short circuiting is decreased. When the diameter of the bed is great as compared to the depth, the point of entrance of the solids is generally located on the opposite side of the bed from their point of exit. In this case the distance between the points of entrance and exit cannot be greatly increased by extending the spill-pipe to the bottom of the fluid bed and nothing is gained thereby.

It might be mentioned that an overflow or spill-pipe generally starts to work normally when its lower opening is covered by the fluidized bed. Therefore extending an overflow or spill-pipe down close to the apertured constriction plate below permits normal operation to start when only a shallow fluidized bed is present in that chamber. This makes starting up operations easier for less solids need to be introduced by the special means previously mentioned.

A spill-pipe or conduit such as is proposed herein for use for feeding solids from one fluidized bed to a lower fluidized bed will not perform its function in a satisfactory manner unless the flow of gas up the spill-pipe is small in comparison with the total flow through the reactor. This is attained by paying proper regard to: (1) the overall length of the spill-pipe; (2) the depth to which said pipe is submerged in the lower fluidized bed; (3) the depth of the two fluidized beds; and (4) the pressure drop across the constriction plate supporting the upper fluidized bed.

Further in the multi-compartment embodiment of this invention, cooling of the treated solids can take place in a compartment immediately subjacent the heat-treatment chamber because the heat (or the fuel) necessary for generating such heat is supplied into the bed of solids in the heat treatment chamber in such a manner that it does not substantially heat up the cooling chamber. Again, by the arrangement of superposed chambers as taught by this invention, the various chambers can be devised as to size and depth of bed they contain to offer effective heat utilization and balance as well as other economically desirable factors. For instance, the comparatively large amount of material in process in the main heat treatment layer 42 serves, through its large heat capacity, to stabilize the temperature therein, making the problem of adding feed, fuel, and air in the correct proportion to maintain the desired temperature, far simpler than in conventional processes. A further advantage is that this reactor furnace can be conveniently insulated, heat losses due to radiation being kept to the minimum, and the temperature in the main reaction chamber can be controlled to a nicety even though the working temperature is high.

The foregoing is more or less explanatory of the principles involved and the general method of operation so there will now be described details of construction. Fig. 2 shows in greater detail a reactor furnace embodying this invention. In the furnace 75 indicates walls of refractory bricks outside of which are sections of insulation 76 and a steel outer casing 77. 78 indicates a removable manhole to provide access to the interior of the furnace. 79 indicates various clean-out openings. 80 indicates various pressure taps, located usually at the top and bottom of each chamber. These taps indicate the pressure in that zone of the furnace where the taps are located and they are suitably connected to a manometer type indicator board that can be observed by the furnace operator. Similarly, 81 indicates various temperature indicators located generally in the top of a chamber and within the bed or layer of that chamber. These, likewise, are suitably connected to an indicator board that can be observed by the furnace operator. The constriction plates 17 and 44, in this embodiment, are made of refractory bricks instead of metal, and the arrangement of the bricks is shown in plan view in Fig. 3 with the apertures being funnel-shaped, while one of them is shown in vertical section in Fig. 5. The latter shows a ball check 20 in place on its seat 19 which is countersunk at about 45 degrees. If a gas fuel jet 64 is used, then each brick preferably has a throat section 66 as shown, but otherwise, such a throat is unnecessary as the aperture 18 can be plainly cylindrical. In order that the refractory brick constriction plates are strong enough to resist the temperature encountered with sagging or warping, it is desirable that the plate be arched as shown, and the bricks tapered from top to bottom, as indicated both in Fig. 2 and Fig. 5.

The preferred construction of the wind-box 58 is shown in greater detail in Fig. 7 and in Fig. 6, which is a plan view. The wind-box is, in this embodiment thereof, formed of a bottom plate 82 having an air inlet pipe 83 with an air entrance 59. Side wall 84, or side walls, close the space between the bottom 82 and the constriction plate 53. This plate is formed of metal and is provided with a plurality of thicker sections 85, each containing the gas permeable vertical aperture 18 and the ball seat 19. An enlarged detail of this is shown in Fig. 8 wherein is also shown the continuous V-weld 86 that holds the thicker section 85 to the thinner plate 53. 80 indicates a pressure tap in the bottom plate 84 of the wind-box 58.

Fig. 9 shows a detail of the cone valve 70 on its shaft or stem 71 that is adapted to open and close the valve away from the lower end of the spill-pipe 41. Fig. 10 shows how the temperature indicator 81 is or can be installed.

It comprises a steel well 90 that extends through the furnace wall and into the freeboard space or the layer in the furnace, as the case may be. It terminates in a terminal head 91 from which lead wires 92 leading from the thermocouple housed in the well 90 to the indicator board located where the furnace operator can see it.

I claim:

1. A reactor for the contacting of solids with gases, comprising an enclosed chamber having a gas outlet in its upper section and a gas inlet in its lower section; an apertured substantially horizontally disposed partition dividing the casing into an upper and a lower compartment with the upper compartment adapted to have maintained therein and in contact with the partition a layer of solids to be treated; a substantially vertically disposed spill-conduit for conducting falling solids from the top of the layer of solids whose elevation is controlled by the top of the spill-conduit to discharge from the chamber; a conduit for conducting feed solids to the layer of solids; the horizontal partition having apertures thereof terminating on the upper face thereof in ball-seats; and a ball for each of such seats.

2. A reactor according to claim 1, wherein the ball bears such a size relationship to the gas passing upwardly through the ball-seat so that the downward super-pressure on the ball is less than the upward pressure exerted on the ball by the gas upflowing past the ball.

3. A reactor according to claim 1, wherein each ball is of a diameter such that its point of tangency with its ball-seat lies below the top of its seat.

4. A reactor according to claim 1, wherein each ball is of a diameter that lies in a range of from substantially one inch to substantially six inches.

5. A reactor according to claim 1, wherein the perforations in the partition are funnel shaped in cross-section.

6. A reactor according to claim 1, wherein the partition includes refractory elements having funnel shaped apertures extending substantially vertically therethrough.

7. A reactor according to claim 1, wherein the ball-seats of the partition are contained in elements inset into the partition.

FRANK S. WHITE.

REFERENCES CITED

The following references are of record in the file of this patent:

UNITED STATES PATENTS

| Number | Name | Date |
|---|---|---|
| 999,320 | Kyll | Aug. 1, 1911 |
| 1,453,735 | Twining | May 1, 1923 |
| 1,776,077 | Messer | Sept. 16, 1930 |
| 1,868,618 | Wagner | July 26, 1932 |
| 2,367,281 | Johnson | Jan. 16, 1945 |
| 2,393,478 | Porter | Jan. 22, 1946 |
| 2,409,707 | Roetheli | Oct. 22, 1946 |
| 2,428,872 | Gunness | Oct. 14, 1947 |
| 2,433,726 | Angell | Dec. 30, 1947 |
| 2,444,990 | Hemminger | July 13, 1948 |
| 2,477,454 | Heath | July 26, 1949 |